Aug. 27, 1957

A. BOUWERS 2,803,996

OBJECTIVE LENS SYSTEM PROVIDED WITH AN
ASPHERICAL CORRECTING PLATE
Filed April 6, 1953

INVENTOR.
ALBERT BOUWERS
BY

United States Patent Office 2,803,996
Patented Aug. 27, 1957

2,803,996

OBJECTIVE LENS SYSTEM PROVIDED WITH AN ASPHERICAL CORRECTING PLATE

Albert Bouwers, The Hague, Netherlands, assignor to N. V. Optische Industrie "De Oude Delft," Delft, Netherlands Application April 6, 1953, Serial No. 346,926

2 Claims. (Cl. 88—57)

The object of the invention is to obtain objectives of great luminosity. When the luminosity of modern objectives is increased, the following problem arises, which appears directly from inspection of the curve representing the spherical aberration as a function of the height of incidence of the rays of light, viz. that with a great height of incidence a very strong overcorrection is present. It is this strong increase of spherical aberration with great heights of incidence, which hampers a further increase of the luminosity.

It has already been proposed to correct the spherical aberration of an optical system by means of a correcting plate with aspherical profile. An example of this is the well-known Schmidt-system. In this system the meridional section of the aspherical surface of the correcting plate is a curve of a higher degree.

Moreover, in U. S. Letters Patent No. 2,448,699 applicant has indicated a system in which correcting plate A is introduced in order to correct part of the total amount of spherical aberration of a spherical mirror S, the other part being compensated by a correcting lens L. Although this construction has the advantage over that indicated by Schmidt in that the correcting plate is easier to make, as its form approaches that of a plane-parallel plate, nevertheless the manufacture is still very difficult. For in the first place the plate must be figured over its full area and in the second place a profile like that of plate A is difficult to relaize, as the thickness of the plate from the centre towards the edge first decreases and then increases.

The problem mentioned in the first paragraph can be solved according to the invention, by adding to the objective, which shows overcorrection towards the border of the aperture, a correcting plate in or near the stop of the objective. This correcting plate, however, has a different form as compared with the Schmidt-plate or the plate described in applicant's cited U. S. patent, viz. such a form that it is plane-parallel in the central part, and towards the border has such an aspherical profile that the overcorrection of the spherical aberration is corrected wholly or in part, whereby the thickness decreases towards the border. In this way the advantage is obtained that the luminosity of the objective is considerably increased with a plate of comparatively simple construction, the central part of the latter being plane-parallel. Furthermore this construction has the advantage that, the thickness of the correcting plate decreases from the centre towards the border, which greatly simplifies the manufacture.

The size and the profile of the correcting zone of the plate can be easily determined when the aberration-curve of the objective is known, e. g. by computing the optical thickness which has to be added or deduced for each height of incidence.

Figure 1:
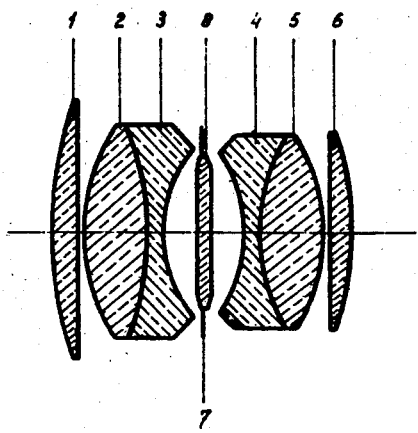
Fig. 1 shows an optical scheme of one embodiment of the invention.

In Fig. 1 an example is given of an objective with a relative aperture of 1:1.5, consisting of lenses 1, 2, 3, 4, 5 and 6. The correcting plate 8 is located in the stop 7.

Figure 2:
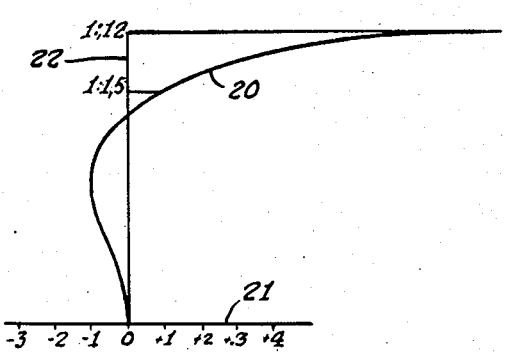
Fig. 2 represents the spherical aberration curve of the system without a correcting plate.

In Fig. 2 the curve 20 of the spherical aberration is represented in the usual way, i. e. the abscissa 21 indicates the longitudinal spherical aberration, the ordinate 22 being equal to the height of incidence of the corresponding ray of light. The scale of the abscissa is such that one unit corresponds with 1% of the focal distance of the objective. A plus sign indicates overcorrection, a minus sign undercorrection.

From this curve it follows that the objective without correcting plate would have such a strong overcorrection for apertures larger than 1:1.5, that it would be useless. Now correcting plate 8 is introduced in the stop 7, which plate is plane-parallel up to a diameter corresponding with 1:1.5, the edge zone situated between apertures 1:1.5 and 1:1.2 having such an aspherical profile that the overcorrection which the objective has in the edge zone without a correcting plate, is nearly completely corrected.

Figure 3:
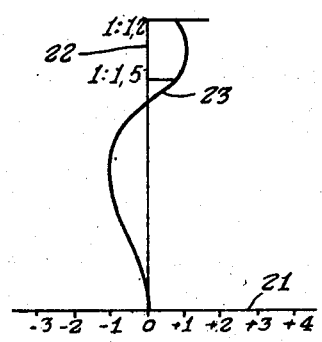
Fig. 3 represents the curve of spherical aberration of the same system but with correcting plate.

The spherical aberration curve 23 of the objective provided with the plate is represented in Fig. 3. This result is obtained with a plate which is easy to construct, as it consists of a plane-parallel plate with an edge zone with decreasing thickness.

In the case that the present invention is applied to catadioptric systems, wherein the central part of the incident beams is obstructed, the central plane-parallel part of the correcting plate may be made partly or wholly opaque, or replaced partly or wholly by an aperture. As a matter of fact the area of the correcting plate corresponding to the obstruction ratio of the system does not have any optical effect and consequently may be executed in an arbitrary way.

Figure 4:
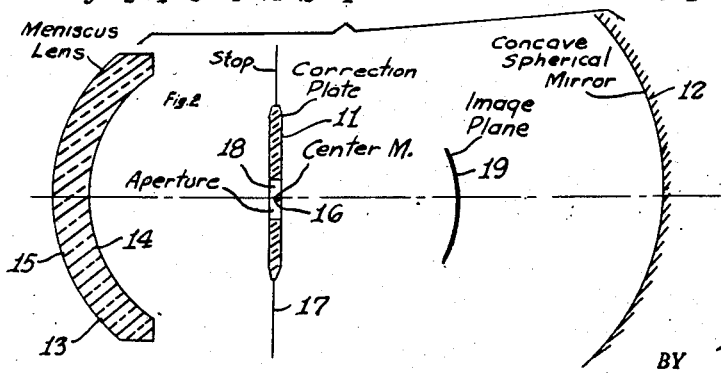
Fig. 4 is a diagrammatic view showing the invention applied to a catadioptric system.

The correcting plate according to the invention may also be applied to catadioptric systems. An example of such a system is shown in Figure 4 wherein, besides the correcting plate 11, a concave spherical mirror 12 and a meniscus lens 13 of small negative power are shown. The meniscus lens has spherical surfaces 14 and 15 whose centres of curvature coincide in the centre of curvature 16 of the mirror, the concave surface 14 facing said centre of curvature 16. The correcting element is located at the position of the stop 17 in the system and is provided with a central aperture 18 corresponding to that part of the beam of light rays traveling towards the mirror 12, which is obstructed by the film support not shown or the like situated at the position of the spherically curved image plane 19.

It will be understood that the light rays passing through the central part of the correcting plate will not contribute to the forming of the image in a catadioptric system and therefore, this central part need not be plane-parallel and may be executed in an arbitrary way, e. g. apertured as shown in Fig. 4.

The meniscus lens 13 introduces a certain amount of spherical aberration compensating the inherent spherical aberration of the spherical mirror, which is of opposite sense.

However, unfortunately, the ratio between the spherical aberration of higher order and of the third order of the meniscus lens appears to be much greater than the corresponding ratio between the higher and third order spherical aberration of opposite sense of the mirror. Consequently it is impossible to completely correct for the spherical aberration of the spherical mirror up to the largest apertures imaginable, as, due to overcompensation by the meniscus lens, the outer zones of the system must exhibit large zonal aberrations when the zonal aberrations of central zones are suppressed.

If, on the other hand, the concave mirror and the meniscus lens are selected such, that the former is corrected for spherical aberration in its outermost zone then large residual zonal aberrations will appear in the central zones of the system.

Thus, in designing a system of this type a compromise has to be found and the aperture has to be limited so as to reduce the zonal aberration, occurring in the outer zone to an admissible value.

It may easily be seen therefore that the curve of zonal aberrations in a system of this kind will be similar to the curve shown in Figure 2, and may be improved by a correcting plate according to the invention. Said plate thereby enabling the designer to greatly enlarge the aperture of the system, as described hereinbefore with respect to the lens system of Fig. 1.

With regard to the geometrical data of the lens system shown in Figure 1 it is desired to point out that this figure is not meant to cover a practical design for an objective. However, objectives of high luminosity which have the general arrangement shown in Figure 1 and which would have an aberration curve of the kind shown in Figure 2 with still increased luminosity, are very commonly used and the computations necessary for the system may be readily made by those skilled in the art. In Figures 2 and 3 the numerals on the abscissae axis 21 designate the spherical aberration $\rho$, expressed in $f/1000$ ($f$=focal length). The numerals on the ordinate axis 22 designate the heights of incidence $h$ of the light rays entering the system, expressed in the corresponding lens apertures.

I claim:

1. An objective for photography, projection and the like, comprising a system of optical elements including a spherical aberration correcting plate located substantially at the stop position of said system, said system without the correcting plate being substantially corrected for spherical aberration in a central zone and showing overcorrection for spherical aberration in the border zone surrounding said central zone, said correcting plate being plane-parallel in its central part corresponding to said central zone of said system and having at least one aspherical surface in its border part corresponding to the border zone of said system showing overcorrection, the thickness of said border part continually decreasing towards the edge of the correcting plate so as to substantially eliminate the said overcorrection.

2. An objective as claimed in claim 1 wherein the system besides the correcting plate comprises a concave spherical mirror and at least one negative meniscus lens whose concave surface is directed towards the centre of curvature of said mirror, said correcting plate being located substantially at the centre of curvature and comprising a central part of arbitrary shape, a first border zone in which the plate is plane-parallel and a second border zone surrounding the first one, in which the thickness of the plate continuously decreases towards the edge of the plate.

References Cited in the file of this patent

UNITED STATES PATENTS

| 2,332,930 | Rinia | Oct. 26, 1943 |
| 2,377,268 | Rinia | May 29, 1945 |
| 2,378,301 | Kaprelian | June 12, 1945 |
| 2,430,150 | Warmisham | Nov. 4, 1947 |
| 2,448,699 | Bouwers | Sept. 7, 1948 |
| 2,596,789 | Tillyer et al. | May 13, 1952 |

FOREIGN PATENTS

| 557,123 | Great Britain | Nov. 4, 1943 |
| 643,659 | Great Britain | Sept. 27, 1950 |